US012091813B1

(12) United States Patent
Wilson

(10) Patent No.: US 12,091,813 B1
(45) Date of Patent: Sep. 17, 2024

(54) SEGMENTED HAMPER WITH MOTION ACTIVATED LIDS

(71) Applicant: Jacqueline Wilson, Toronto (CA)

(72) Inventor: Jacqueline Wilson, Toronto (CA)

( * ) Notice: Subject to any disclaimer, the term of this patent is extended or adjusted under 35 U.S.C. 154(b) by 0 days.

(21) Appl. No.: 17/482,635

(22) Filed: Sep. 23, 2021

(51) Int. Cl.
*D06F 95/00* (2006.01)
*B65F 1/16* (2006.01)

(52) U.S. Cl.
CPC .......... *D06F 95/004* (2013.01); *B65F 1/1638* (2013.01); *B65F 2210/168* (2013.01)

(58) Field of Classification Search
CPC .................. D06F 95/004; B65F 1/1638; B65F 2210/168; B65F 1/0053; B65F 1/0073; B65F 2001/0086
USPC .......................................................... 220/211
See application file for complete search history.

(56) References Cited

U.S. PATENT DOCUMENTS 5,222,853 A * 6/1993 Carson .................... B65F 1/004 414/408
8,253,363 B2 8/2012 Shih
8,910,813 B1 * 12/2014 Barre .................... D06F 95/002 220/528
9,221,601 B2 12/2015 Crawford et al.
9,332,729 B1 5/2016 Hyle et al.
9,856,080 B2 1/2018 Yang et al.
10,172,503 B2 1/2019 Wei
10,472,170 B2 11/2019 Yang et al.
10,597,228 B1 3/2020 Yao
2007/0182551 A1 8/2007 Yang et al.
2009/0218341 A1 * 9/2009 Wu ........................... B65F 1/06 220/4.28
2017/0254016 A1 * 9/2017 Barre .................... D06F 95/002
2017/0313503 A1 * 11/2017 Busch ..................... B65F 1/067
2018/0056336 A1 * 3/2018 Castelli ................... B07C 7/005
2020/0079587 A1 * 3/2020 Han ....................... B65F 1/1638
2020/0082354 A1 * 3/2020 Kurani ................... G01K 1/026
2021/0061558 A1 * 3/2021 Shek ...................... B65F 1/1638
2021/0269238 A1 * 9/2021 Shek ...................... B65F 1/1638
2021/0323762 A1 * 10/2021 Wang ......................... B65F 1/08

FOREIGN PATENT DOCUMENTS

WO WO-9216414 A1 * 10/1992 ............. B65F 1/004

* cited by examiner

*Primary Examiner* — J. Gregory Pickett
*Assistant Examiner* — Niki M Eloshway
(74) *Attorney, Agent, or Firm* — Cramer Patent & Design PLLC; Aaron R. Cramer

(57) ABSTRACT

A segmented hamper with motion activated lids is a plurality of laundry hampers having a plurality of motion sensor which lift an individual hamper lid when activated. The plurality of hampers is disposed upon a base having four caster wheels. The hamper is provided with a control panel and battery operated power source.

1 Claim, 5 Drawing Sheets

SEGMENTED HAMPER WITH MOTION ACTIVATED LIDS

RELATED APPLICATIONS

Non-applicable.

FIELD OF THE INVENTION

The present invention relates generally to a clothes hamper having a sensor and more specifically to a clothes hamper having a motion sensor.

BACKGROUND OF THE INVENTION

In recent society, there has been a trend toward increased sanitization of everyday objects and surfaces one tends to come in contact with. This trend is evidenced by a quick trip to one's local store where one will find the shelves lined with antibacterial soap, hand lotion sanitizer, anti-bacterial surface cleaner, HEPA air filtration systems and the like.

At the same time, pandemics such as COVID-19 have made us aware that viruses can remain alive on items and surfaces waiting to infect us with just a simple touch. Such precautions are especially warranted in location such as hospitals, nursing homes, and hotels where people are present for long periods of times. Linens such as bed sheets, towels, dirty clothes, and the like must be collected and washed. Such items are collected in stored in multi-compartment hampers with individual lids. As such lids are accessed and opened, they form one more common surface which can harbor germs, bacteria, and viruses such as COVID-19 which is then passed on to others who use the hamper or to other linens that should brush up against the lid. Accordingly, there exists a need for a means by which the commonly touched surface of a hamper lid can be eliminated as a possible contagion transfer surface. The development of the segmented hamper with motion activated lids fulfills this need.

SUMMARY OF THE INVENTION

To achieve the above and other objectives, the present invention provides for a segmented hamper, having, a frame having a plurality of containers, a lid disposed on an upper top edge of each of the containers, a rear of each of the lids include a hinge pivot upon which an electrically operated closure mechanism is mounted and the lid is lifted upward along a travel path, and each of the containers having one of the electrically operated closure mechanisms, a plurality of casters supporting the frame to allow for mobility in a location, a control panel adapted to be mounted on an upper front of the frame to provide visual access to an approaching user, a user-replaceable battery disposed within the control panel, and a microcontroller routing the electrical power from the user-replaceable battery. the user-replaceable battery electrically powering the segmented hamper.

The frame may be made of steel. The frame may be made of heavy-duty impact rated plastic. The containers may include 4 containers. The containers may be a plurality of textile-based bags. The container may be color-coded to indicate its functionality to eliminate touching the lid. The control panel may be activated, the electrically operated closure mechanism may move the lids along the travel path. The control panel may include an open switch, a close switch, a battery compartment, and a proximity detector. The open switch and the close switch may be a pushbutton. The proximity detector may result in opening the lids as the approaching user approaches the segmented hamper. The proximity detector, the user-replaceable battery, the microcontroller, the open switch, and the close switch may be disposed on the control panel. The proximity detector, the open switch, and the close switch may input a plurality of signals to the microcontroller. The open switch and the close switch may override the proximity detector when the proximity detector does not properly detect the approaching user or close the lids to override the predetermined time delay by the microcontroller. The approaching user may remain in front of the segmented hamper as long as the approaching user remains in front of the segmented hamper and the lids will remain open. The lids may close after a predetermined time delay when the approaching user walks away from the segmented hamper. The predetermined time delay may be 10 seconds. The proximity detector may be selected from the group consisting of an infrared proximity detector, an ultrasonic proximity detector, a capacitive proximity detector, or an optical proximity detector. The segmented hamper also may have a plurality of wiring run from each of the electrically operated closure mechanism to the control panel. The microcontroller may be selected from the group consisting of a single board computer microcontroller, an Arduino microcontroller, or a Raspberry Pi microcontroller. The microcontroller and its output may be directed to a series of bi-directional motors that allow a polarity to be revered by the microcontroller to allow for selective opening or closing through the electrically operated closure mechanism.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
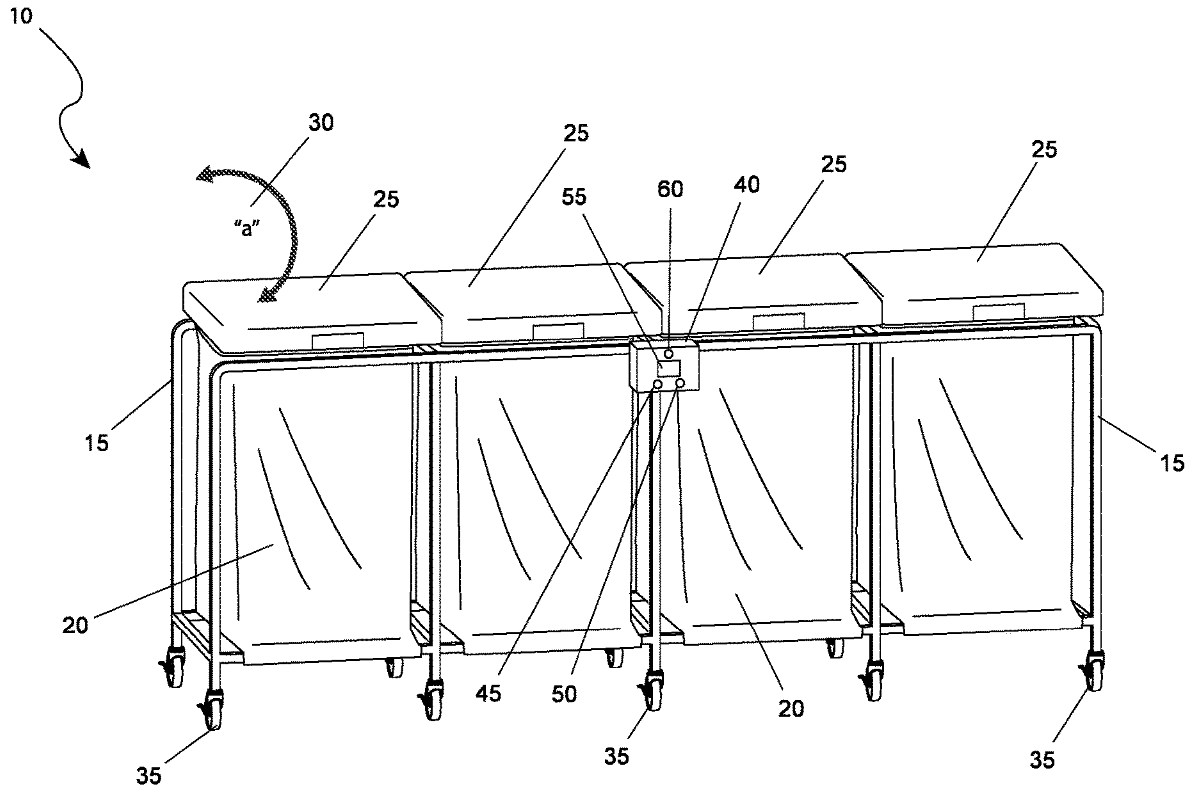
FIG. 1 is a perspective view of the segmented hamper, according to the preferred embodiment of the present invention.

10 segmented hamper
15 frame
20 container
25 lid
30 travel path "a"
35 caster
40 control panel
45 open switch
50 close switch
55 battery compartment
60 proximity detector
65 hinge pivot
70 closure mechanism 75 wiring
80 battery
85 microcontroller
90 bi-directional motor

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a perspective view of the segmented hamper 10, according to the preferred embodiment of the present invention is disclosed. The segmented hamper (herein also described as the "hamper") 10, comprises a multicompartment device for segregated material such as soiled bed linen and bed pads, soiled wash, soiled clothes, garbage and the like with lid covers 25 that automatically open when approached. The hamper 10 provides for a frame 15 which forms the structure of the invention. The frame 15 is envisioned to be made of steel or heavy-duty impact rated plastic. The frame 15 provides for multiple containers 20, herein shown as four (4) textile-based bags. It is noted that the quantity of containers 20 nor their composition, is intended to be a limiting factor of the present invention. The dimension of each container 20 is envisioned to be approximately forty-two inches (42 in.) tall, fourteen inches (14 in.) wide and fourteen inches (14 in.) deep. Each container 20 is provided with a lid 25 which lifts upward along a travel path "a" 30. The frame 15 is supported by multiple casters 35 to allow for mobility in locations such as a hotel, a hospital, a skilled care facility, an assisted care facility, or the like. A control panel 40 is mounted on the upper front of the frame 15 such that it has visual access to any approaching user. The control panel 40 is provided with an open switch 45, a close switch 50, a battery compartment 55 and a proximity detector 60. The open switch 45 and close switch 50 are preferably envisioned as pushbuttons. Functionality of the components of the control panel 40 will be described in greater detail herein below.

Figure 2:
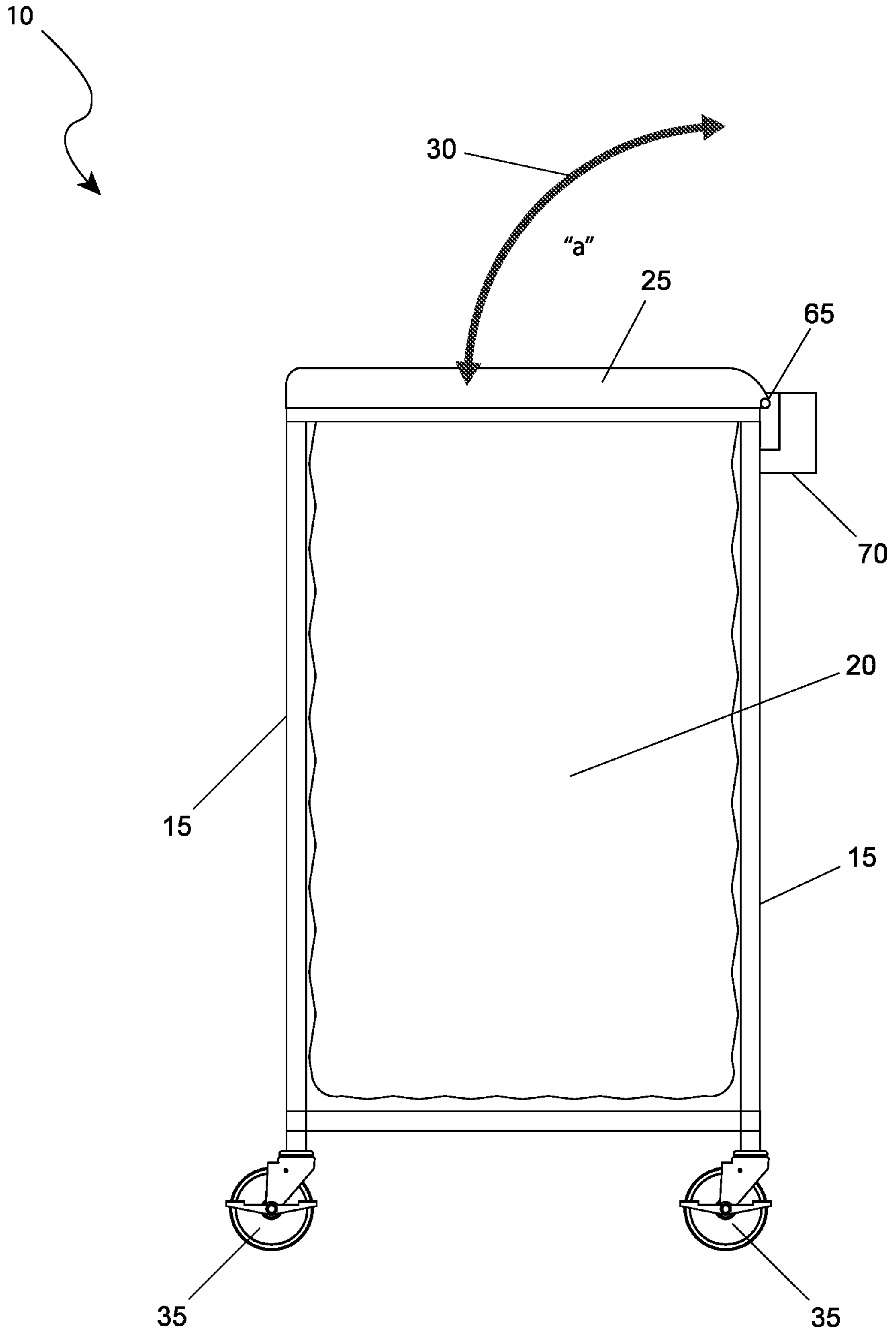
FIG. 2 is a side view of the segmented hamper, according to the preferred embodiment of the present invention.

Referring next to FIG. 2, a side view of the hamper 10, according to the preferred embodiment of the present invention is depicted. This view discloses the containers 20 contained within the frame 15 and the casters 35 at the bottom. The lids 25 are shown in a closed or sealed position. The rear of each lid 25 is provided with a hinge pivot 65 upon which an electrically operated closure mechanism 70 is mounted. Once activated by the control panel 40 (as shown in FIG. 1), the closure mechanism 70 moves the lids 25 along the travel path "a" 30.

Figure 3:
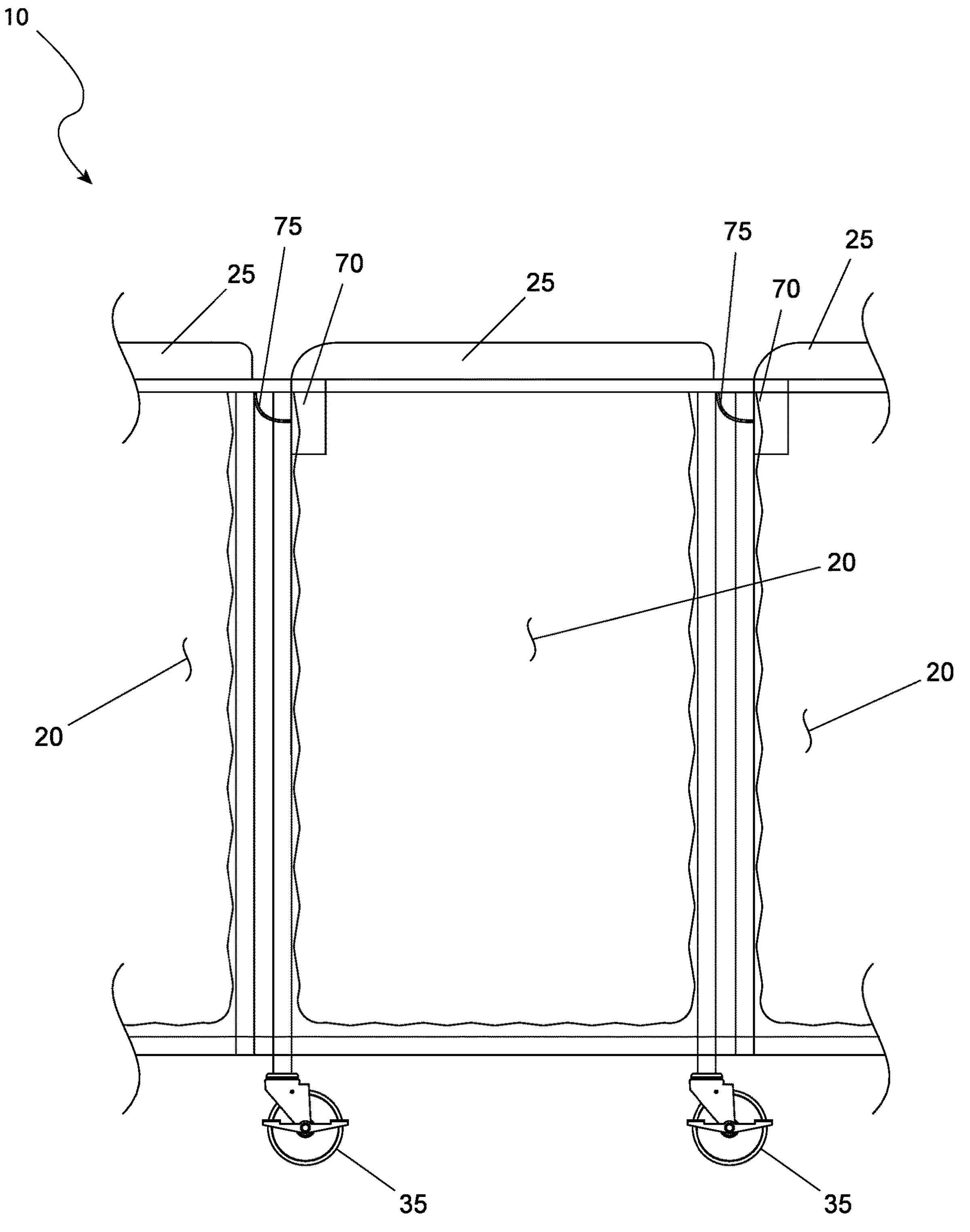
FIG. 3 is a partial rear view of the segmented hamper, according to the preferred embodiment of the present invention.

Referring now to FIG. 3, a partial rear view of the hamper 10, according to the preferred embodiment of the present invention is shown. Each container 20 is provided with its own closure mechanism 70 as shown. Wiring 75 from each closure mechanism 70 is routed to the control panel 40 (as shown in FIG. 1).

Figure 4:
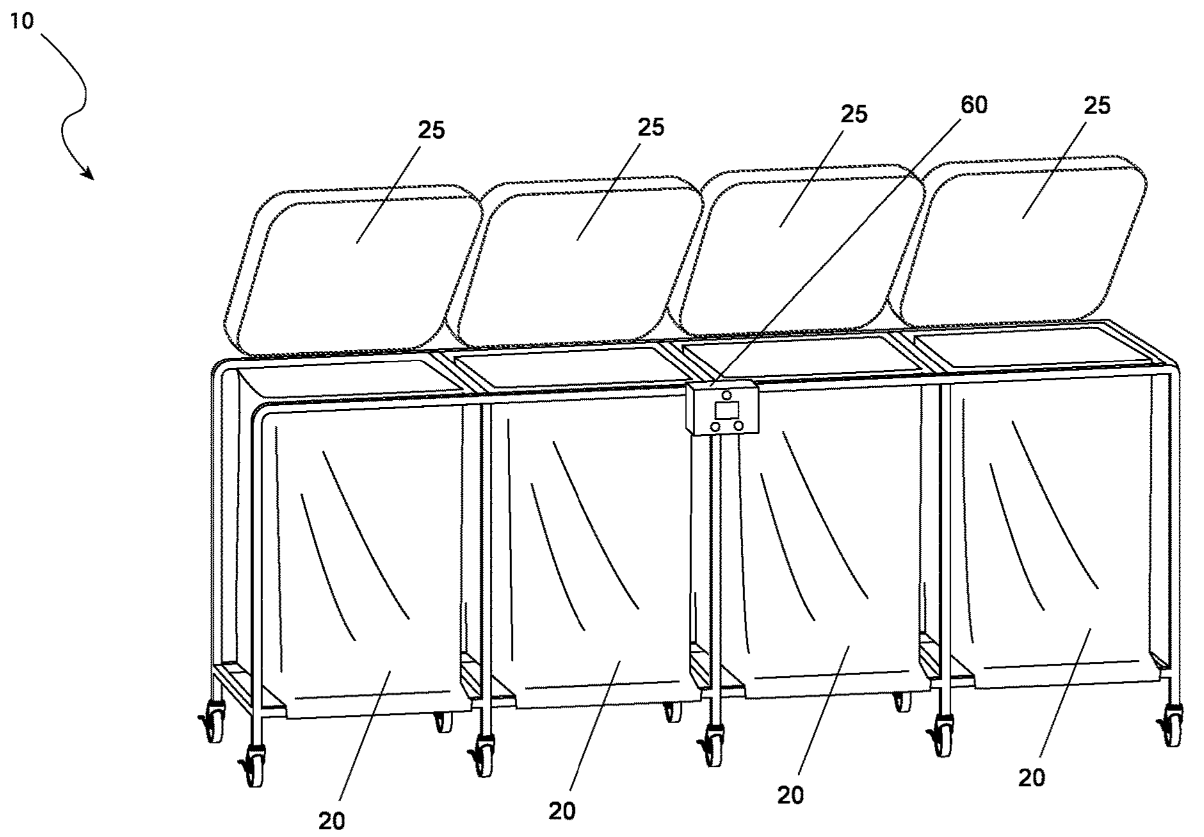
FIG. 4 is a perspective view of the segmented hamper, shown in an activated state, according to the preferred embodiment of the present invention.

Referring next to FIG. 4, a perspective view of the hamper 10, shown in an activated state, according to the preferred embodiment of the present invention is disclosed. The proximity detector 60 can be infrared, ultrasonic, capacitive, optical, or similar. The exact type of proximity detector 60 is not intended to be a limiting factor of the present invention. As a user approaches the hamper 10, the proximity detector 60 resulting in opening (activation) of the lids 25. As long as the user remains in front of the hamper 10, the lids 25 will remain open. Should the user walk away from the hamper 10, the lids 25 will close after a time delay, (envisioned to be approximately ten seconds (10 sec.). Each container 20 is envisioned to be color-coded to indicate its functionality such as in an exemplary embodiment where red is for bed linen and bed pads, blue is for soiled wash, yellow is for soiled clothes, and black is for garbage. Such action is envisioned to be useful for nurses or nurses' aids with soiled linens or clothing, housekeepers with bed linens, custodians with trash, or similar workers in similar locations. This eliminates touching the lid 25 thus limiting transfer of germs, bacteria, viruses, dirt, and other contaminants. This described functionality of the hamper 10 is similar to that of a trashcan with an automatically opening lid when approached.

Figure 5:
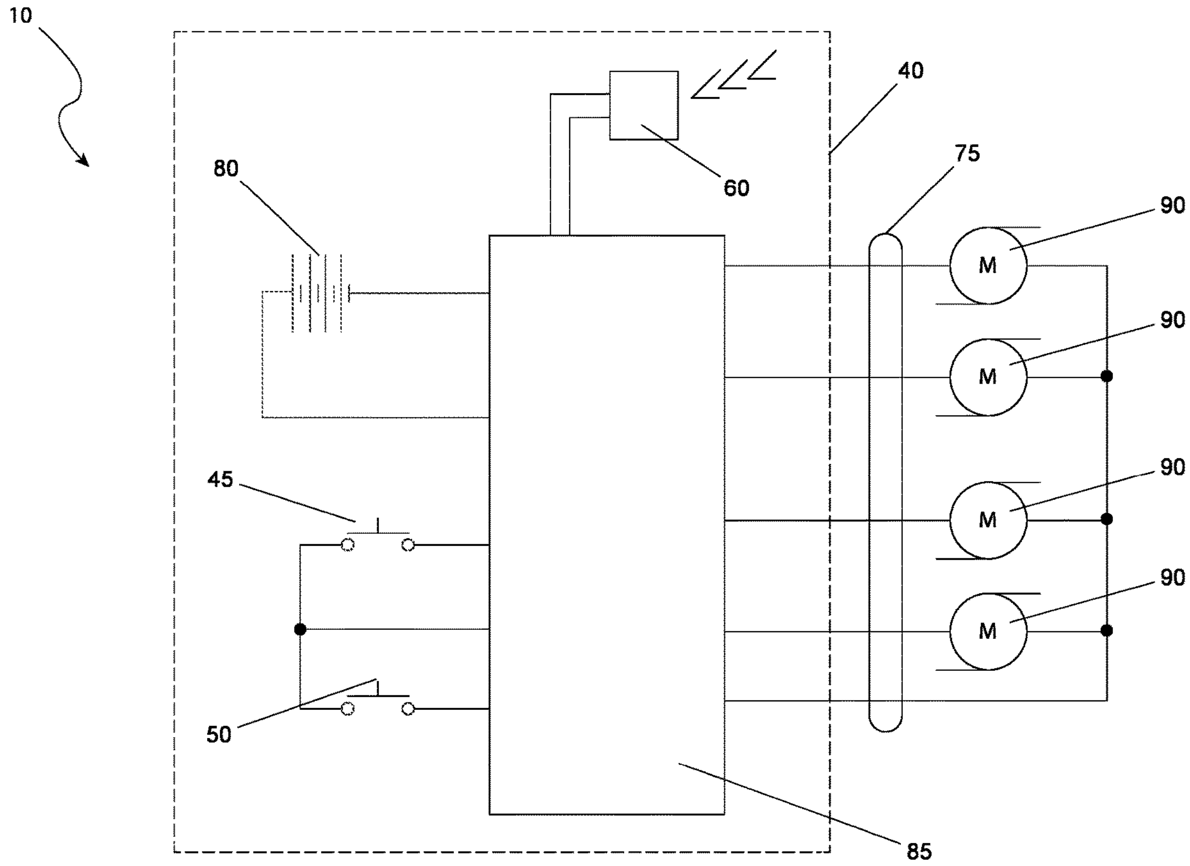
FIG. 5 is an electrical block diagram of the segmented hamper, according to the preferred embodiment of the present invention.

Referring to FIG. 5 an electrical block diagram of the hamper 10, according to the preferred embodiment of the present invention is depicted. Power for the hamper 10 is provided by a user-replaceable battery 80 located behind the battery compartment 55 (as shown in FIG. 1). Said power is routed to a microcontroller 85 such as a single board computer (SBC) including an Arduino®, Raspberry Pi®, or the like. Inputs to the microcontroller 85 are provided by the proximity detector 60, the open switch 45 and the close switch 50. The open switch 45 and the close switch 50 are used to override the proximity detector 60 should the proximity detector 60 not properly detect the user or close the lids 25 more rapidly to override the time delay functionality provided by the microcontroller 85. The proximity detector 60, the battery 80, the microcontroller 85, the open switch 45, and the close switch 50 are all located in the control panel 40. The outputs of the microcontroller 85 are directed to a series of bi-directional motors 90, (whose quantity is equal to the quantity of containers 20 (as shown in FIG. 1 and FIG. 4) via the wiring 75. The bi-directional nature of the bi-directional motors 90, allow the polarity to be revered by the microcontroller 85 to allow for selective opening or closing through the closure mechanism 70 (as shown in FIG. 2).

2. OPERATION OF THE PREFERRED EMBODIMENT

The preferred embodiment of the present invention can be utilized by the common user in a simple and effortless manner with little or no training. It is envisioned that the hamper 10 would be constructed in general accordance with FIG. 1 through FIG. 5. The user would procure the hamper 10 from conventional procurement channels such as hospital supply houses, hospitality supply houses, mail order and internet supply houses and the like. Special attention would be paid to the number of containers 20 needed, (at least one (1)), color-coding, size of the containers 20, and the like.

After procurement and prior to utilization, the hamper 10 would be prepared in the following manner: a battery 80 would be placed within the battery compartment 55, the multiple containers 20 would be installed in the frame 15; color-coded as necessary; and the hamper 10 placed in an appropriate location such as a hallway, laundry room, utility space or the like. At this point in time, the hamper 10 is ready for use.

During utilization of the hamper 10, the following procedure would be initiated: the user would approach the hamper 10 with a load of soiled linens, laundry, clothing, trash, or similar materials; the proximity detector 60 would detect the approaching user and send the appropriate signal to the microcontroller 85; the microcontroller 85 in turns sends an output signal to the multiple bi-directional motors 90 in the closure mechanism 70, thus opening any and all lids 25; the user then deposits the trash or soiled items. The user would then walk away. After the proximity detector 60 no longer produces an input signal for the microcontroller 85, the microcontroller 85 will initiate a time delay; at the conclusion of the time delay, the microcontroller 85 will issue a reverse polarity signal to the bi-directional motors 90, enabling them to close. The open switch 45 and the close switch 50 may be activated at any time to initiate opening or closing of the lids 25 regardless of the operation of the proximity detector 60 or the time delay.

After use of the hamper 10, it is ready for repeated use as aforementioned described or emptying of the contained soiled items or trash in a repeating and cyclical manner.

The features of the hamper 10 provides the following advantages over conventional hamper systems: it is touchless, durable, easy to move, convenient, time saving, and reduces the tendency to transfer germs, bacteria, viruses, and other contagions.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A segmented clothes hamper comprising:

a frame constructed from a material selected from the group consisting of steel and heavy-duty impact-rated plastic;

a plurality of textile-based containers, each container equipped with a lid operated by an electrically activated closure mechanism, wherein the lids are configured to open along a predefined path in response to user proximity;

a control panel mounted on an upper front of the frame, comprising an open switch, a close switch, both configured as pushbuttons, a user-replaceable battery, a microcontroller for routing electrical power, and a proximity detector capable of employing at least one detection method from infrared, ultrasonic, capacitive, or optical;

a plurality of casters for mobility;

a network of wiring connecting the electrically operated closure mechanisms of each container to the control panel; and, a microcontroller directing outputs to a series of bi-directional motors corresponding to a number of containers, thereby facilitating the selective opening or closing of lids through reversible motor action; and, wherein the control panel enables manual override of the proximity detector through the pushbuttons and maintains the lids in an open position as long as a user's presence is detected, followed by automatic closure after a predetermined time delay;

wherein the hamper includes four color-coded containers to facilitate material sorting without requiring direct contact with the lids, enhancing hygiene and usability in environments such as hospitals, hotels, or care facilities;

wherein the proximity detector initiates the opening of the lids via the electrically operated closure mechanism, with the microcontroller managing the operation from power supplied by the user-replaceable battery; and, wherein the microcontroller is capable of interfacing with bi-directional motors connected to each lid's closure mechanism, allowing for reversible lid motion to enable selective opening or closing based on an inputs from the proximity detector and manual pushbuttons.

* * * * *